(12) United States Patent
Schulte et al.

(10) Patent No.: US 7,822,853 B2
(45) Date of Patent: Oct. 26, 2010

(54) STABILIZATION OF DISTRIBUTED SYSTEMS

(75) Inventors: Wolfram Schulte, Redmond, WA (US); Ethan K. Jackson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 99 days.

(21) Appl. No.: 12/242,742

(22) Filed: Sep. 30, 2008

(65) Prior Publication Data

US 2010/0082802 A1   Apr. 1, 2010

(51) Int. Cl.
*G06F 15/173* (2006.01)
(52) U.S. Cl. .................. 709/224; 709/217; 709/219
(58) Field of Classification Search .......... 709/217, 709/219, 214, 224; 707/10, 101, 1, 201
See application file for complete search history.

(56) References Cited

U.S. PATENT DOCUMENTS

| | | | |
|---|---|---|---|
| 6,058,416 A | 5/2000 | Mukherjee et al. | |
| 6,615,253 B1 | 9/2003 | Bowman-Amuah | |
| 7,281,236 B1 | 10/2007 | Galvin et al. | |
| 7,318,074 B2 | 1/2008 | Iyengar et al. | |
| 7,370,053 B2 | 5/2008 | Cabrera et al. | |
| 7,403,946 B1 * | 7/2008 | Taylor | 707/10 |
| 7,451,163 B2 * | 11/2008 | Selman et al. | 707/200 |
| 2002/0188538 A1 | 12/2002 | Robertson et al. | |
| 2003/0191832 A1 | 10/2003 | Satyavolu et al. | |
| 2004/0268312 A1 | 12/2004 | Abe et al. | |
| 2007/0044151 A1 * | 2/2007 | Whitmore | 726/23 |
| 2007/0239797 A1 | 10/2007 | Cattell et al. | |

OTHER PUBLICATIONS

Arkin, "Business Process Modeling Language", retrieved at <<http://xml.coverpages.org/BPML-2002.pdf>>, BPMI.org, Nov. 13, 2002, pp. 1-98.

Arkin, et al, "Web Services Business Process Execution Language", retrieved May 19, 2008 at <<http://www.oasis-open.org/committees/download.php/10347/wsbpel-specification-draft-120204.htm>>, Oasis, Dec. 1, 2004, pp. 1-40.

Berger, "Basic Theory of Reduction Congruence for Two Timed Asynchronous pi-Calculi", retreived at >>http://citeseer.ist.psu.edu/cache/papers/cs/31956/http:zSzzSzwww.dcs.qmul.ac.ukzSz~martinbzSzpublicationszSzconcur04.pdf/berger04basic.pdf>>, Department of Computer Science, Queen Mary, University of London, pp. 1-16.

Berger, "Towards Abstractions for Distributed Systems", retrieved at >>http://citeseer.ist.psu.edu/cache/papers/cs/32482/http:zSzzSzwww.dcs.qmul.ac.ukzSz~martinbzSzpublicationszSztoo-short-too-boring.pdf/berger04towards.pdf>>, University of London, Jun. 13, 2004, pp. i-xii, 1-246.

Bocchi, et al., "A Calculus for Long-running Transactions", retrieved on May 16, 2008 at <<http://www.cs.unibo.it/~zavattar/Publication/fmoods03.ps>>, pp. 1-15.

(Continued)

*Primary Examiner*—Frantz B Jean
(74) *Attorney, Agent, or Firm*—Lee & Hayes, PLLC

(57) ABSTRACT

One or more embodiments, described herein, are directed towards a technology for analyzing a distributed system in order to determine one or more inconsistencies placing the distributed system in an unstable state. Once the one or more inconsistencies are determined, one or more operations reconciling the inconsistencies are defined in order to stabilize the distributed system.

13 Claims, 7 Drawing Sheets

OTHER PUBLICATIONS

Bray, et al, "Extensible Markup Language (XML) 1.0 (Fourth Edition)", retrieved May 19, 2008 at <<http://www.w3.org/TR/2006/REC-xml-20060816/>>, W3C, Aug. 16, 2006, pp. 1-33.

Breu, et al, "Web Service Engineering—Advancing a New Software Engineering Discipline", retrieved at <<http://www.springerlink.com/content/5fflqclcv5exd1f4/fulltext.pdf>>, ICWE, 2005, pp. 8-18.

Bruni, et al, "Orchestrating Transactions in Join Calculus", retrieved from <<http://citeseer.ist.psu.edu/cache/papers/cs/33163/http:zSzSzwww.di.unipi.itzSz~bruniSzpublicationszSzconcur2002.pdf/bruni02orchestrating.pdf>>, Department of Information, University of Pisa, Italy, pp. 1-15.

Bruni, et al, "Theoretical Foundations for Compensations in Flow Composition Languages", retrieved at <<http://www.di.unipi.it/~melgratt/publications/popl2005.pdf>>, POPL, Jan. 12-14, 2005, pp. 1-12.

Burbeck, "The Tao of e-Business Services", retrieved May 19, 2008 at >>http://www.ibm.com/developerworks/library/ws-tao/index.html>>, IBM, Oct. 1, 2000, pp. 1-9.

Butler, et al, "An Operational Semantics for StAC, a Language for Modelling Long-Running Business Transactions", retrieved at <<http://citeseerx.ist.psu.edu/viewdoc/summary;jsessionid=7F904798A641C0C559DF59BB5E536306?doi=10.1.1.80.1031>>, Department of Computer Science, Technical University of Lisbon, pp. 1-15.

"Catalog of OMG Modeling and Metadata Specifications", retrieved May 19, 2008 at <<http://www.omg.org/technology/ documents/modeling_spec_catalog.htm#UML_for_EDOC>>, OMG, pp. 1-4.

Christensen, et al, "Web Services Description Language (WSDL) 1.1", retrieved May 19, 2008 at <<http://www.w3.org/TR/ wsdl, W3C, Mar. 15, 2001, pp. 1-31.

Claessens, et al, "A Tangled World Wide Web of Security Issues", retrieved May 19, 2008 at <<http://www.firstmonday.org/issues/issue7_3/claessens/>>, First Monday, 2002, pp. 1-29.

Clarke, et al, "Model Checking and Abstraction", retrieved at <<http://www.cs.cmu.edu/~emc/papers/Papers%20In%20Refereed%20Journals/Model%20Checking%20and%20Abstraction94.pdf>>, ACM, vol. 16, No. 5, Sep. 1994, pp. 1512-1542.

"CORBA Component Model Specification", retrieved at <<http://www.omg.org/docs/formal/06-04-01.pdf>>, OMG, Version 4.0, Jun. 4, 2001, pp. 1-350.

"CORBA/IIOP Specification", retrieved May 19, 2008 at <<http://www.omg.org/technology/documents/formal/corba_iiop.htm>>, OMG, 1997-2008, p. 1.

Cover, "Universal Description, Discovery, and Integration (UDDI)", retrieved May 19, 2008 at <<http://xml.coverpages.org/uddi.html>>, Oasis, Mar. 13, 2008, pp. 1-133.

Csertan, et al, "VIATRA—Visual Automated Transformations for Formal Verification and Validation of UML Models (Tool Demonstration)", retrieved at <<http://home.mit.bme.hu/~varro/publication/ase2002_varro.pdf>>, Budapest University of Technology and Economics Department of Measurement and Information Systems, pp. 1-10.

Greenfield, et al., Consistency for Web Services Applications, retrieved at <<http://www.vldb2005.org/program/paper/ thu/p1199-greenfield.pdf>>, Proceedings of the 31st VLDB Conference, Trondheim, Norway, 2005, pp. 1199-1203.

Gudgin, et al, "Web Services Addressing—Core", retrieved May 19, 2008 at <<http://www.w3.org/TR/2004/WD-ws-addr-core-20041208/>>, W3C, 2004, pp. 1-15.

Guidi, et al, "A Formal Framework for Web Services Coordination", retrieved at <<http://www.cs.unibo.it/~lucchi/ papers/FOCLASACR04.pdf>>, Department of Computer Science, University of Bologna, 2004, pp. 1-18.

Hoare, "A Calculus of Compensations for Long-Running Transactions", retrieved at <<http://research.microsoft.com/collaboration/university/europe/events/dotnetcc/Version2/Tony%20HoareMarch11.Long-running%20transactions.

ppt#256,1,A calculus of compensations for long-running transactions>>, Cambridge, Mar. 2002, pp. 1-33.

Houston, et al, "The CORBA Activity Service Framework for Supporting Extended Transactions", retrieved at <<http://citeseer.ist.psu.edu/cache/papers/cs/23158/http:zSzSznenya.ms.mff.cuni.czzSzrelatedzSzpublzSztpzSzCORBAWorkflow03.pdf/houston01corba.pdf>>, Middleware, 2001, pp. 1-18.

"HTTP—Hypertext Transfer Protocol", retrieved May 19, 2008 at <<http://www.w3.org/Protocols/>>, W3C, 1996-2003, , pp. 1-5.

Huhns, et al "Service-Oriented Computing: Key Concepts and Principles", retrieved at <<http://www.cse.sc.edu/~huhns/journalpapers/V9N1soc.pdf>>, IEEE, Jan.-Feb. 2005, pp. 2-8.

"IEEE Recommended Practice for Architectural Description of Software-Intensive Systems", retrieved at <<http:// ieeexplore.ieee.org/iel5/7040/18957/00875998.pdf>>, IEEE, Sep. 21, 2000, pp. i-vi, 1-23.

Igarashi, et al, "A Generic Type System for the Pi-Calculus", retrieved May 27, 2008 at <<http://coblitz.codeen.org:3125/citeseer.ist.psu.edu/cache/papers/cs/31171/http:zSzSzwww.yl.is.s.u-tokyo.ac.jpzSz~kobazSzpaperszSzPOPL01-revised.pdf/igarashi01generic.pdf>>, ACM, 2000, pp. 1-14.

"Interworking Between CORBA and TMN Systems Specification", retrieved at http://www.omg.org/docs/formal/00-08-01.pdf>>, OMG, Version 1.0, Aug. 2000, pp. i-iv, 1-4, 1-1-1-10, 2-1-2-48, 3-1-3-86, 4-1-4-30, 5-1-5-44, A-1-A-4, B-1-B-54, C-1-C-6, I-1-I-4 .

"Java EE at a Glance", retrieved May 19, 2008 at <<http://java.sun.com/j2ee/>>, Sun Microsystems, 1994-2008, pp. 1-2.

Karsai, et al, "Model-Integrated Development of Embedded Software", retrieved at <<http://fountain.isis.vanderbilt.edu/publications/KSLB_MIC.pdf>>, IEEE, Jan. 2003, pp. 1-30.

Kavantas, et al, "Web Services Choreography Description Language Version 1.0", retrieved May 19, 2008 at <<http://www.w3.org/TR/ws-cdl-10/>>, W3C, Nov. 9, 2005, pp. 1-50.

Kiepuszewski, "Expressiveness and Suitability of Languages for Control Flow Modelling in Workflows", retrieved at <<http://coblitz.codeen.org:3125/citeseer.ist.psu.edu/cache/papers/cs/27006/http:zSzSztmitwww.tm.tue.nlzSzresearchzSzpatternszSzphd_bartek.pdf/kiepuszewski02expressiveness.pdf>>, Bartoz Kiepuszewski, Nov. 13, 2002, pp. 1-207.

Konigs, et al, "Multi-Domain Integration with MOF and Extended Triple Graph Grammars", retrieved at <<http://drops.dagstuhl.de/opus/volltexte/2005/22/pdf/04101.KoenigsAlexander1.Paper.pdf>>, Dagstuhl Seminar Proceedings, pp. 1-8.

Lafon, "Web Services Activity", retrieved May 19, 2008 at <<http://www.w3.org/2002/ws/>>, W3C, Apr. 11, 2008, pp. 1-3.

Lan, et al., Consistency Maintenance in Peer-to-Peer File Sharing Networks, retrieved on May 16, 2008 at <<http:// ieeexplore.ieee.org/iel5/8597/27236/01210292.pdf?temp=x&htry=1>>, Proceedings of the Third IEEE Workshop on Internet Applications, 2003, pp. 1-5.

Laneve, et al, "Solos in Concert", retrieved at <<http://citeseer.ist.psu.edu/cache/papers/cs/29832/http:zSzSzwww.cs.unibo.itzSz~lanevezSzpaperszSzfinal.pdf/laneve02solos.pdf>>, Mathematical Structures in Computer Science, May 7, 2002, pp. 1-27.

Little, "Web Services Transactions: Past, Present, and Future", retrieved at <<http://www.idealliance.org/papers/dx_xml03/papers/05-02-02/05-02-02.pdf>>, deepX Ltd., pp. 1-10.

Lucchi, et al, "A Pi-Calculus Based Semantics for WS-BPEL", retrieved at <http://www.cs.unibo.it/~lucchi/papers/jlap-wsfm.pdf>>, Jun. 10, 2005, pp. 1-38.

Mazzara, et al, "A Framework for Generic Error Handling in Business Processes", retrieved at <<http://www.cs.unibo.it/~lucchi/papers/wsfm04.pdf>>, Department of Computer Science, University of Bologna, 2004, pp. 1-13.

Mazzara, et al., "A Case Study of Web Services Orchestration", retrieved on May 16, 2008 at <<http://www.springerlink.com/content/yvq99geyaktgu39g/fulltext.pdf>>, Springer-Verlag Berlin Heidelberg, 2005, pp. 1-16.

Mazzara, "Timing Issues in Web Services Composition", retrieved at <<http://www.springerlink.com/ content/796n187355667472/fulltext.pdf>>, Springer-Verlag, 2005, pp. 287-302.

Meredith, et al, "Contracts and Types", retrieved at <<http://delivery.acm.org/10.1145/950000/944236/p41-meredith.pdf?key1=944236&key2=6470621121&coll=GUIDE&dl=GUIDE&CFID=28670752&CFTOKEN=93172164>>, Communications of the ACM, vol. 46, No. 10, Oct. 2003, pp. 41-47.

"Microsoft BizTalk Server", retrieved May 19, 2008 at <<http://www.microsoft.com/biztalk/en/us/default.aspx>>, Microsoft, 2008, p. 1.

"Microsoft.Net Framework", retrieved May 19, 2008 at <<http://www.microsoft.com/net/>>, Microsoft, p. 1.

Miller, et al, "MDA Guide Version 1.0.1", retrieved at <<http://www.omg.org/docs/omg/03-06-01.pdf>>, OMG, Jun. 12, 2003, p. 1-2, i-ii, 1-1-1-6, 2-1-2-8, 3-1-3-14, 4-1-4-6, 5-1-5-6, 6-1-6-6, 7-1-7-6, A-1-A-4, B-1-B-2 .

Milner, "Communicating and Mobile Systems: the pi-Calculus", retrieved at <<http://assets.cambridge.org/052164/3201/sample/0521643201WS.pdf>>, Cambridge University Press, 1999, pp. i-vii, 3-7.

Milner, et al., "A Calculus of Mobile Processes, Part 1", retrieved on May 16, 2008 at <<http://citeseer.ist.psu.edu/cache/papers/cs/2086/http:zSzzSzwww.chongju-e.ac.krzSz~cmyangzSzrefszSzECS-LFCS-89-85.pdf/milner89calculus. pdf>>, Jun. 1989, pp. 1-46.

"MSDN, DCOM Technical Overview", retrieved May 19, 2008 at <<http://msdn.microsoft.com/en-us/library/ms809340.aspx>>, Microsoft Corporation, Nov. 1996, pp. 1-27.

Neema, et al, "A Visually-Specified Code Generator for Simulink/Stateflow", retrieved at <<http://ieeexplore.ieee.org/iel5/10093/32326/01509514.pdf>>, IEEE, 2005, pp. 1-3.

Neumann, "System and Network Trustworthiness in Perspective", retrieved at <<http://www.csl.sri.com/users/neumann/ccs06.pdf>>, CCS, Oct. 30-Nov. 3, 2006, pp. 1-5.

"Notification Service Specification", retrieved at <<http://www.omg.org/docs/formal/04-10-11.pdf>>, OMG, Version 1.1, Oct. 2004, pp. 1-227.

"Oasis", retrieved May 19, 2008 at <<http://www.oasis-open.org/home/index.php>>, Oasis, 1993-2008, pp. 1-2.

"Open Distributed Processing Reference Model", retrieved May 19, 2008 at <<http://www.joaquin.net/ODP/>>, ISO/IEC, 1995, 1996, p. 1.

Parrow, et al, "The Fusion Calculus: Expressiveness and Symmetry in Mobile Processes", retrieved at <<http://citeseer.ist.psu.edu/cache/papers/cs/11600/http:zSzzSzwww.sics.sezSz~joachimzSzfusion-full.pdf/parrow97fusion.pdf>>, Dec. 5, 1997, pp. 1-28.

"Patterns Library", retrieved May 19, 2008 at <<http://www.hillside.net/patterns/>>, Hillside.net, 2007, p. 1.

Peltz, "Web Services Orchestration and Choreography", retrieved at <<http://ieeexplore.ieee.org/iel5/2/27718/01236471.pdf?tp=&arnumber=1236471&isnumber=27718>>, IEEE, 2003, pp. 46-52.

"Policies and Procedures of the OMG Technical Process", retrieved at <<http://www.omg.org/docs/pp/07-08-01.pdf>>, OMG, Version 2.6, Aug. 7, 2007, pp. 1-47.

"Security Service Specification", retrieved at <<http://www.omg.org/docs/formal/02-03-11.pdf>>, OMG, Version 1.8, Mar. 2002, pp. 1-430.

"Service Oriented Architecture—SOA," retrieved May 19, 2008 at <<http://www-306.ibm.com/software/solutions/soa/>>, IBM, pp. 1-2.

Shapiro, "A Comparison of XPDL, BPML and BPEL4WS Cape Visions", retrieved at <<http://xml.coverpages.org/Shapiro-XPDL.pdf>>, Cape Visions, May 19, 2001, pp. 1-17.

Smith, et al, "Workflow is Just a Pi Process", retrieved at <<http://www.bptrends.com/publicationfiles/01-04%20Workflow%20is%20just%20a%20Pi%20Process%20Smith-Fingar.pdf>>, BP Trends, Jan. 2004, pp. 1-36.

Soderstrom, et al, "Towards a Framework for Comparing Process Modelling Languages", retrieved at <<http://citeseer.ist.psu.edu/557255.html>>, Springer-Verlag, 2002, pp. 600-611.

Sperberg-McQueen, et al, "XML Schema", retrieved May 19, 2008 at <<http://www.w3.org/XML/Schema>>, W3C, Jan. 18, 2008, pp. 1-29.

Stone, "Object Management Architecture Guide", retrieved at <<http://www.omg.org/docs/ab/97-05-05.pdf>>, OMG, pp. 1-172.

"The Object Management Group (OMG)", retrieved May 19, 2008 at <<http://www.omg.org/>>, OMG, May 16, 2008, pp. 1-2.

"The OMG Hitchhiker's Guide", retrieved at <<http://www.omg.org/docs/omg/07-12-03.pdf>>, OMG, Version 7.6, Dec. 3, 2007, pp. 1-103.

"UML Profile for CORBA Specification", retrieved at <<http://www.omg.org/docs/formal/02-04-01.pdf>>, OMG, Version 1.0, Apr. 2002, pp. 1-102.

"Unified Modeling Language (UML), Version 2.1.2", retrieved at <<http://www.omg.org/technology/documents/formal/uml.htm>>, OMG, 1997-2008, p. 1.

Van der Aalst, "Don't Go with the Flow: Web Services Composition Standards Exposed", retrieved at <<http://citeseer.ist.psu.edu/cache/papers/cs/26994/http:zSzSztmitwww.tm.tue.nlzSzstaffzSzwvdaalstzSzPublicationszSzz3.pdf/vanderaalst03dont.pdf>> IEEE, Jan./Feb. 2003, pp. 1-7.

Van der Aalst, et al, "Pattern Based Analysis of BPML (and WSCI)", retrieved at <<http://xml.coverpages.org/Aalst-BPML.pdf>>, FIT Technical Report, 2002, pp. 1-27.

Van der Aalst, et al, "Workflow Management Models, Methods and Systems", retrieved at <<http://fp.tm.tue.nl/beta/publications/working%20papers/Beta_wp52.pdf>> W.M.P. van der Aalst/K.M. van Hee, 2000, pp. 1-359.

"WS BPEL Issues List", retrieved May 19, 2008 at <<http://www.oasis-open.org/home/index.php>>, Oasis, Feb. 2, 2005, pp. 1-152.

Aldred, et al, "Communication Abstractions for Distributed Business Processes", retrieved at <<http://is.tm.tue.nl/staff/wvdaalst/BPMcenter/reports/2006/BPM-06-28.pdf>>, Java Message Service, Nov. 2006, pp. 1-20.

Alonso, "Myths around Web Services", retrieved at <<sites.computer.org/debull/A02dec/alonso.ps>, IEEE, 2002, , pp. 1-7.

Andrews, et al, "Business Process Execution Language for Web Services, Version 1", retrieved at <<http://download.boulder.ibm.com/ibmdl/pub/software/dw/specs/ws-bpel/ws-bpel.pdf>, BEA Systems, Internations Business Machines Corporation, Microsoft Corporation, SAP AG, Siebel Systems, 2002, 2003, pp. 1-136.

Bruni, et al, "Orchestrating Transactions in Join Calculus", retrieved from <<http://citeseer.ist.psu.edu/cache/papers/cs/33163/http:zSzzSzwww.di.unipi.itzSz~brunizSzpublicationszSzconcur2002.pdf/bruni02orchestrating.pdf>>, Department of Information, University of Pisa, Italy, pp. 1-15.

Burbeck, "The Tao of e-Business", retrieved May 19, 2008 at <<http://www.ibm.com/developerworks/library/ws-tao/index.html>>, IBM, Oct. 1, 2000, pp. 1-9.

Christensen, et al, "Web Services Description Language (WSDL) 1.1", retrieved May 19, 2008 at <<http://www.w3.org/TR/wsdl>>, W3C, Mar. 15, 2001, pp. 1-31.

Claessens, et al., "A Tangled World Wide Web of Security Issues", retrieved May 19, 2008 at <<http://www.firstmonday.org/issues/issue7_3/claessens/>>, First Monday, 2002, pp. 1-29.

Csertan, et al, "VIATRA—Visual Automated Transformations for Formal Verification and Validation of UML Models (Tool Demonstration)", retrieved at <<http://home.mit.bme.hu/~varro/publication/ase2002_varro.pdf>>, Budapest University of Technology and Economics Department of Measurement and Information Systems, pp. 1-10.

Curbera, et al, "Unraveling the Web Services Web", retrieved at <<http://ieeexplore.ieee.org/iel5/4236/21386/00991449.pdf>>, IEEE Internet Computing, Mar.-Apr. 2002, pp. 86-93.

Dalal, et al, "Coordinating Business Transactions on the Web", retrieved at <<http://ieeexplore.ieee.org/iel5/4236/26323/01167337.pdf?tp=&arnumber=1167337&isnumber=26323>>, IEEE, Jan.-Feb. 2003, pp. 30-39.

Daniels, "Modeling with a Sense of Purpose", retrieved at <21 http://www.syntropy.co.uk/papers/modelingwithpurpose.pdf>>, IEEE Software, Jan./Feb. 2002, pp. 1-3.

Dantsin, et al, "Complexity and Expressive Power of Logic Programming", retrieved at <<http://citeseer.ist.psu.edu/cache/papers/cs/22901/http:zSzzSzwww.kr.tuwien.ac.atzSzstaffzSzeiterzSzet-archivezSzccc97.pdf/dantsin97complexity.pdf>>, IEEE, 1997, pp. 1-20.

Dumas, et al, "UML Activity Diagrams as a Workflow Specification Language", retrieved at <21 http://www.workflowpatterns.com/documentation/documents/uml_patterns.pdf>>, UML, 2001, pp. 1-15.

"ebXML Business Process Specification Schema Version 1.01", retrieved at <<http://www.ebxml.org/specs/ebBPSS.pdf, Oasis, May 11, 2001, pp. i-v, 1-136.

Ellis, et al., "Consistency Maintenance and Group Undo in Real-Time Group Editors", retrieved on May 20, 2008 at <<http://www.cit.gu.edu.au/~scz/sigce/conferences/group99ws.html, ACM Group'99 Workshop on Consistency Maintenance, Oct. 1999, pp. 1-4.

"Enterprise JavaBeans Technology", retrieved May 19, 2008 at <<http://java.sun.com/products/ejb/>>, Sun Microsystems, 1994-2008, p. 1.

Gardner, et al, "The Fusion Machine", retrieved at <<http://www.wischik.com/lu/research/fm-eabs.pdf>>, Mar. 27, 2002, pp. 1-18.

Green, et al, "An Ontological Analysis of Integrated Process Modelling", retrieved at <<http://www.springerlink.com/content/cv05bqy7x931hh5m/fulltext.pdf, Springer-Verlag, 1999, pp. 225-240.

Jackson, et al, "Towards a Formal Foundation for Domain Specific Modeling Language", retrieved at <<http://research.microsoft.com/~ejackson/publications/emsoft06_pres.pdf>>, pp. 1-27.

Jurjens, et al, "Tools for Secure Systems Development with UML: Security Analysis with ATPs", retrieved at <<http://www4.informatik.tu-muenchen.de/~juerjens/papers/fase05.pdf>>, Software and Systems Engineering, pp. 1-39.

Liu, et al, "Heterogeneous Modeling and Design of Control Systems", retrieved at <<http://ptolemy.eecs.berkeley.edu/publications/papers/03/controlSys/controlSys.pdf>>, University of California, pp. 1-26.

"Microsoft.Net Framework", retrieved May 19, 2008 at <<http://www.microsoft.com/net/>>, Microsoft, p. 1.

Van der Aalst, et al, "Pattern Based Analysis of BPML(and WSCI)", retrieved at <<http://xml.coverpages.org/Aalst-BPML.pdf>>, FIT Technical Report, 2002, pp. 1-27.

Van der Aalst, et al, "YAWL: Yet Another Workflow Language", retrieved at <<http://www.workflowpatterns.com/documentation/docuements/yawl_qut_report_FIT-TR-2002-06.pdf>>, FIT Technical Report, 2002, pp. 1-37.

"W3C World Wide Web Consortium", retrieved May 19, 2008 at <<http://www.w3.org>>, W3C, pp. 1-6.

"W3C, Coordination Specification", retrieved May 19, 2008 at <<http://www.w3.org>>, W3C, pp. 1-6.

"W3C, Latest Soap Versions", retrieved May 19, 2008 at <<http://www.w3.org/TR/soap/>>, W3C, 2004, pp. 1-2.

"W3C, Transaction Specification", retrieved May 19, 2008 at <<http://www.w3.org>>, W3C, pp. 1-6.

"Web Service Choreography Interface (WSCI) 1.0", retrieved at <<http://www.w3.org/TR/wsci/>>, W3C, 2001-2002, pp. 1-109.

"Workflow Management Coalition", retrieved May 19, 2008 at <<http://www.wfmc.org>>, Workflow Management Coalition, pp. 1-2.

"Workflow Patterns", retrieved at <<http://www.workflowpatterns.com/>>, Workflow Patterns Initiative, 2007, pp. 1-201.

"Workflow Process Definition Interface—XML Process Definition Language", retrieved at <<http://www.wfmc.org/standards/docs/TC-1025_10_xpdl_102502.pdf>>, Workflow Management Coalition, Version 1.0, Oct. 25, 2002, pp. 1-87.

"Workflow Standard—Interoperability Wf-XML Binding", retrieved at <<http://www.wfmc.org/standards/docs/Wf-XML-11.pdf>>, Workflow Management Coalition, Version 1.1, Nov. 14, 2001, pp. 1-57.

Barth, et al, "Privacy and Contextual Integrity: Framework and Applications", Proceedings of the 2006 IEEE Symposium on Security and Privacy, retrieved at <<http://www.nyu.edu/projects/nissenbaum/papers/ci.pdf>>, May 2006, pp. 1-15.

Berger, "Basic Theory of Reduction Congruence for Two Timed Asynchronous pi-Calculi", Presented at Fifteenth International Conference on Concurrency Theory (CONCUR 2004), London, England, Aug. 31- Sep. 3, 2004, retrieved at <<http://citeseer.ist.psu.edu/cache/papers/cs/31956/http:zSzzSzwww.dcs.qmul.ac.ukzSz~martinbzSzpublicationszSzconcur04.pdf/berger04basic.pdf>>, Department of Computer Science, Queen Mary, University of London, Aug. 31, 2004, pp. 1-16.

Berry, et al, "System Level Design and Verification Using a Synchronous Language", IEEE/ACM International Conference on Computer Aided Design (ICCAD'03), San Jose, Nov. 2003, retrieved at <<http://www.esterel-technologies.com/files/ICCAD-Tutorial.pdf>>, Nov. 2003, pp. 1-7.

Bezivin, et al, "Towards a Precise Definition of the OMG/MDA Framework", Presented at ASE'01, Automated Software Engineering, San Diego, USA, Nov. 26-29, 2001, retrieved at <<http://www.sciences.univ-nantes.fr/lina/atl/www/papers/ASE01.OG.JB.pdf>>, Universite de Nantes and HEC - Montreal, Nov. 26, 2001, pp. 1-8.

Butler, et al, "An Operational Semantics for StAC, a Language for Modelling Long-Running Business Transactions", In Coordination 2004, vol. 2949 of Lecture Notes in Computer Science, retrieved at <<http://citeseerx.ist.psu.edu/viewdoc/summary;jsessionid=7F904798A641C0C559DF59BB5E536306?doi=10.1.1.80.1031>>, Department of Computer Science, Technical University of Lisbon, Feb. 2004, pp. 1-15.

Jackson, et al, "Towards a Formal Foundation for Domain Specific Modeling Language", EMSOFT 06, Oct. 23, Seoul, Korea, retrieved at <<http://research.microsoft.com/~ejackson/publications/emsoft06_pres.pdf>>, Institute for Software Integrated Systems, Vanderbilt University, pp. 1-27.

Jurjens, et al, "Tools for Secure Systems Development with UML: Security Analysis with ATPs", Springer-Verlag Academic Publishers, retrieved at <<http://www4.informatik.tu-muenchen.de/~juerjens/papers/fase05.pdf>>, Software and Systems Engineering, Apr. 2005, pp. 1-39.

Laneve, et al, "Foundations of Web Transactions", FOSSACS 2005: Proceedings of the 8th International Conference on Foundations of Software Science and Computational Structures, Springer-Verlag Lecture Notes in Computer Science 3441, retrieved at <<http://www.cs.unibo.it/~laneve/papers/fossacs-ea.pdf>>, Apr. 2005, pp. 282-298.

Liu, et al, "Heterogeneous Modeling and Design of Control Systems", IEEE Control System Magazine, Oct. 27, 2001, retrieved at http://ptolemy.eecs.berkeley.edu/publications/papers/03/controlSys/controlSys.pdf>>, University of California, pp. 1-26.

Sprinkle, et al, "Domain Model Translation Using Graph Transformations", Proceedings of 10th IEEE International Conference and Workshop on the Engineering of Computer-Based Systems, 2003., Apr. 7-10, 2003, retrieved at <<http://ieeexplore.ieee.org/iel5/8501/26873/01194795.pdf?arnumber=1194795, Institute for Software-Integrated Systems Vanderbilt University, Apr. 7, 2003, pp. 159-168.

Van der Aalst, "Pi Calculus Versus Petri Nets: Let us Eat 'Humble Pie' Rather than Further Inflate the 'Pi Hype'", BPTrends, 3(5):1-11, retrieved at <<http://is.tm.tue.nl/research/patterns/download/pi-hype.pdf>>, May 2005, pp. 1-11.

Van der Aalst, "The Application of Petri Nets to Workflow Management", The Journal of Circuits, Systems and Computers, vol. 8 (1):21-66, retrieved at <<http://is.tm.tue.nl/staff/wvdaalst/publications/p53,pdf>>, Department of Mathematics and Computing Science, Eindhoven University, Feb. 1998, pp. 1-53.

* cited by examiner

STABILIZATION OF DISTRIBUTED SYSTEMS

BACKGROUND

Data-centric business applications use distributed systems to create, modify, transfer, share, acquire, store and/or verify data located in different locations, hereinafter referred to as nodes. Such types of data, for example, includes data associated with data-centric business applications such as on-line stores, patient portals, network transactions, merging databases, etc.

Distributed systems share and transmit information amongst multiple nodes. Generally speaking, a node is a location that stores information within the distributed system. Examples of nodes include a computer on a network, a server on a network, or one of multiple data storage locations on a computer or server.

Maintaining data integrity when utilizing a distributed system in data-centric business applications becomes problematic when data is created, modified, transferred, shared, acquired, stored and/or verified at one or more nodes across a distributed system. For example, a server computer on a network may be configured to maintain a backup copy of a document created on a client computer.

However, if the server computer and the client computer are not connected via the network when a copy of the document is modified on the client computer, then the backup copy of the document stored on the server computer is not updated in accordance with the modified version of the original document because there is no established connection. Therefore, data integrity is not maintained across the nodes within the distributed system because the backup copy of the document stored on the server computer is not the same as the original document stored on the client computer.

Synchronization is a conventional approach to solving such data integrity problems. Conventional synchronization has provided a way to directly transfer data point-to-point from one node to another within a distributed system. In the example relating to a document backup system explained above, the server computer maintains an exact copy of the original document created and/or modified on the client computer.

Thus, synchronization provides a direct file transfer by comparing data bits and/or copying the data from a first location to another location in order to provide the same document in two different locations. This direct file transfer thereby maintains data integrity across the first location and another location.

However, mere point-to-point synchronization does not solve higher level policies necessary to maintain data integrity across a more complex distributed system. For example, when merging two databases containing a list of employee names into a single database, mere file transfer results in several data integrity problems, such as duplicated names. Name duplication within a merged database may then lead to internal processing errors related to employee information. For example, Arnold Johnson might not receive his paycheck because the paycheck was sent to another Arnold Johnson. In this exemplary scenario, the distributed system does not maintain data integrity because of the confusion that results when having duplicate names. Conventional point-to-point synchronization does not solve ensuring that the distributed system exchanges data so that data integrity is eventually established.

SUMMARY

One or more embodiments described herein are directed towards a technology for analyzing a distributed system in order to determine one or more inconsistencies placing the distributed system in an unstable state. Once the one or more inconsistencies are determined, one or more operations reconciling the inconsistencies are defined in order to stabilize the distributed system.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same numbers are used throughout the drawings to reference like elements and features.

DETAILED DESCRIPTION

Figure 1:
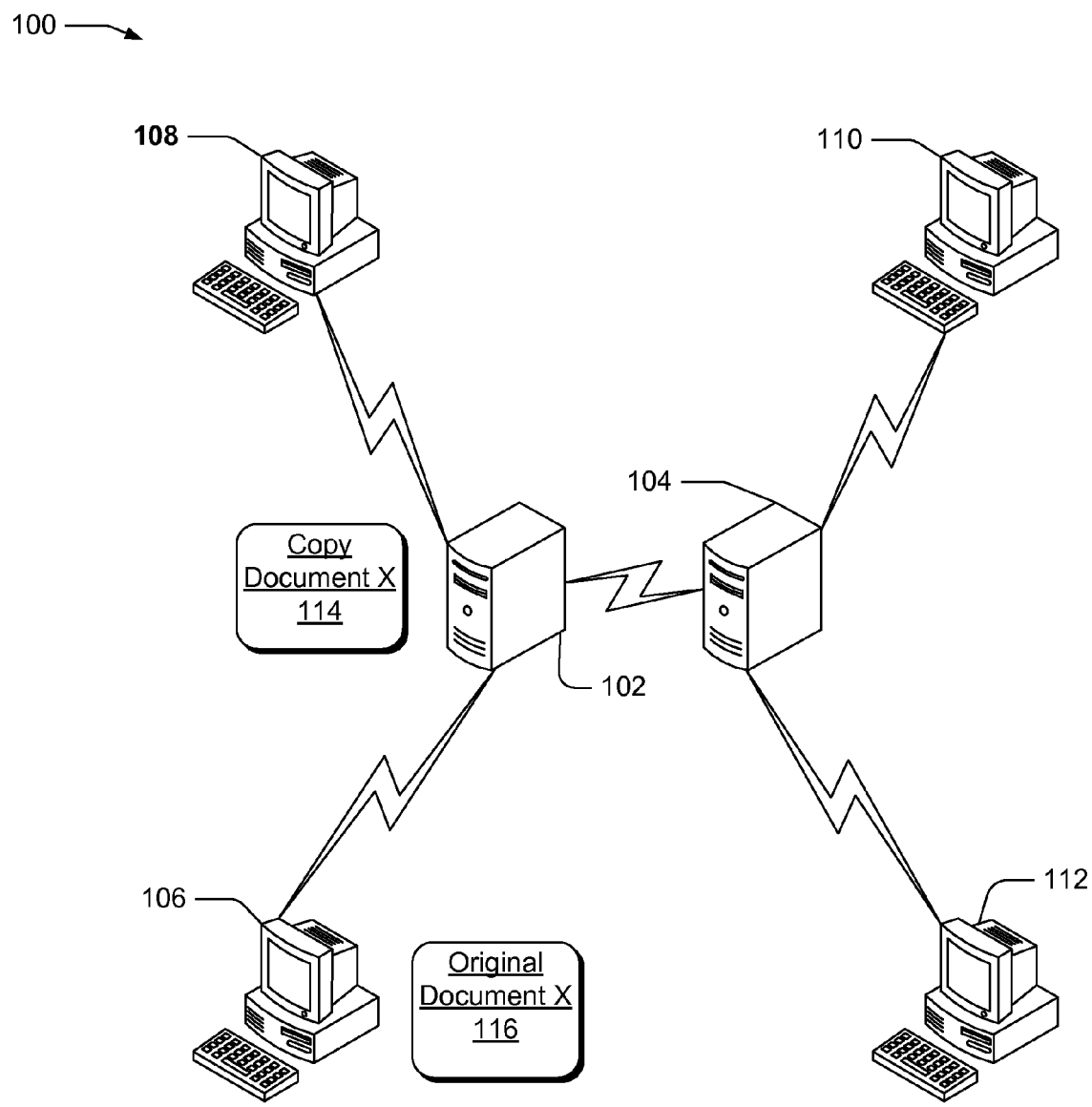
FIG. 1 is an illustration of an environment of an exemplary distributed system.

Data-centric business applications use distributed systems to manage particular types of data across a set of nodes. Such data-centric business applications include on-line stores, patient portals, network transactions, merging databases, etc.

A distributed system creates, modifies, transfers, shares, acquires, stores and/or verifies data across one or more nodes. A node is any location where data is stored within a distributed system. Thus, a distributed system may include one or more nodes within a single computer or one or more nodes across multiple computers that are connected via one or more networks. Distributed systems maintain data integrity across a particular set of nodes. For example, in a document management system, a backup copy of a document created on a client computer may be stored on a server computer connected to a client computer via one or more networks.

However, nodes in a distributed system are continually connected and disconnected from one another. For example, two nodes are disconnected from one another when a client logs off the server or when a network connection fails. Conventional approaches have used synchronization to directly copy data from one node to another when one node is reconnected to another node in order to maintain data integrity. In other words, synchronization ensures upon reconnection that the backup copy of the document stored on the server computer is the same as the document created on the client computer.

Synchronization is implemented when a connection between a client computer and server computer is reestablished, by transferring, bit by bit, the original document on the client computer to the server computer. However, synchronization does not account for higher level policies associated with data-centric applications utilizing distributed systems.

Some examples of higher level policies that mere synchronization does not resolve include, but are not limited to: informing a system analyst via a notification message when an issue that must be corrected manually arises, locating necessary user credential information within a distributed system in order to verify transactional data, changing values that fall outside an acceptable range to a default value within the acceptable range, and automatically calculating the primary forms of inconsistency.

Described herein are one or more embodiments that maintain data consistency across a particular set of nodes in a distributed system.

Information located within a distributed system includes one or more types of data. The one or more types of data located within the distributed system are consistent from one node to another when the data does not contradict defined conditions for each type of data. This contradiction of defined conditions for a particular type of data often leads to consequential errors and/or conflicts in the distributed system, and prohibits efficiency and functionality within the distributed system.

Data consistency is different than data integrity, described in relation to synchronization above. Data consistency is defined with one or more conditions. These defined conditions vary from one type of data to another. They are not limited to a simple file transfer, or direct copying, as described in relation to synchronization.

In light of various connections and disconnections occurring between nodes in a distributed system, numerous issues may arise in trying to maintain consistency across the data within the distributed system and there is no guarantee that the data located across a particular set of nodes in a distributed system is consistent from one node to another.

For example, FIG. 1 illustrates a distributed system 100 including two servers (102 and 104) and four client computers (106, 108, 110 and 112) connected to each other by network connections (114, 116, 118, 120 and 122). In an exemplary implementation, FIG. 1 relates to a document management distributed system that maintains consistency by continually copying and updating a stored copy of document X 114 on server 102 when the original document X 116 has been created and/or modified on a client computer 106.

From this example, an inconsistency occurs if the copy of the document X 114 on the server 102 is not the same as the original document X 116 that is created or modified on the client computer 106. More specifically, an inconsistency results when a condition specifying that the exact same copy be stored on both the server and the client computer has been violated.

On the other hand, by way of example, data consistency is not limited to having the same data in two different locations. In fact, inconsistencies may also result from having the exact same data in two different locations.

Figure 2:
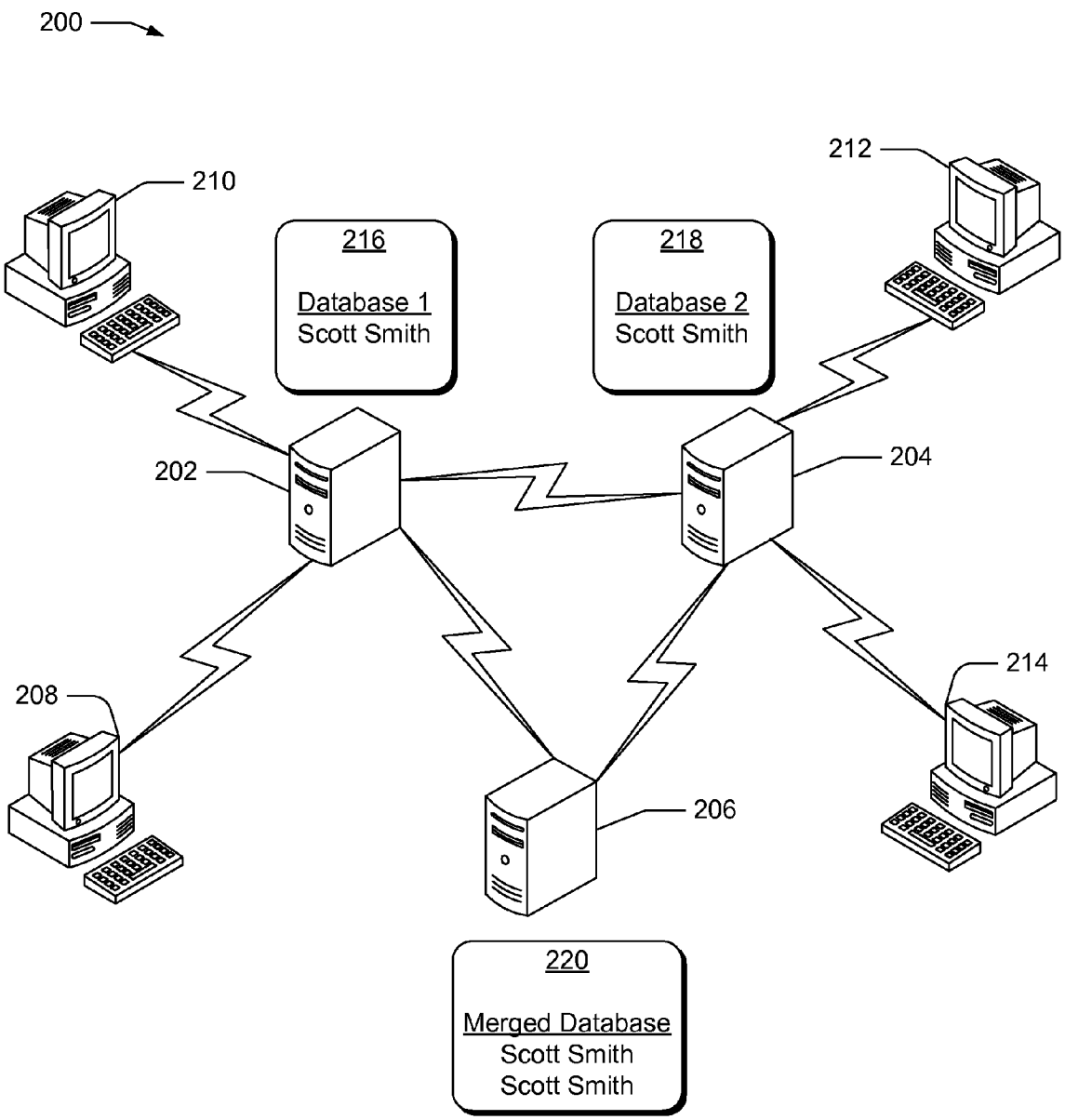
FIG. 2 is another illustration of an environment of an exemplary distributed system.

For example, FIG. 2 illustrates an environment 200 similar to FIG. 1. FIG. 2, however, includes three servers (202, 204 and 206), each connected to one another. Clients (208, 210, 212 and 214) are able to access information located on the three servers. Say, for example, server 202 and server 204 each store separate employee databases (216 and 218), each database corresponding to a separate company, with hundreds of employee names in each database. If there was a business merger between the two companies, one company acquiring the other, and it is necessary to merge the two separate employee databases (216 and 218) within a distributed system into one single merged database 220 located on server 206, there is a chance the resulting merged database 220 located at server 206 will produce two identical employee names, such as "Scott Smith".

In this scenario, a defined condition may be flagging that there can not be two identical employee names in a single database because identical names lead to errors and confusion when trying to identify and locate a particular one of the employees with the identical name "Scott Smith". In this example, an inconsistency results when there are two listings of the exact same data.

Thus, as FIGS. 1 and 2 illustrate, if one or more conditions corresponding to a particular type of data have been violated, one or more inconsistencies may result. These inconsistencies may then cause an error to occur and there is no defined reconciliation that automatically provides a solution to resolve the error.

Furthermore, these possible inconsistencies may lead to troublesome situations within the distributed system because in many circumstances, once detected, a user must manually analyze the distributed system to determine what is causing the error and then must manually correct the error, taking away valuable time and resources. Thus, a distributed system that can not automatically reconcile one or more possible inconsistencies amongst one or more types of data located within a distributed system is not self-stabilizing.

Reconciliation is defined as one or more operations that resolve the one or more inconsistencies. In one embodiment, a user analyzing the distributed system is a system analyst. Thus, depending on the type of inconsistency, reconciliation can be a wide variety of operations defined by the system analyst analyzing the distributed system. For example, specific examples of reconciliation include: sending a notification or message to a system administrator in order to notify them of an error so that the error will be manually corrected, an automatic update of pricing information with regard to a product or service that has changed over time, deleting a copy of duplicated data, canceling a credit card transaction, updating credit card information, changing the network location where data is verified, etc. This list is not exhaustive and it is noted that reconciliation encompasses any defined operations capable of reconciling an inconsistency.

In the following discussion, an exemplary environment and exemplary procedures are described which are operable to implement a self-stabilizing distributed system. Stability over a distributed system is achieved when:
    the one or more types of data located within a set of nodes in the distributed system are consistent;
    particular nodes in the distributed system do not communicate with each other, and therefore are not be obligated to stabilize; and
    there are one or more inconsistencies amongst the one or more types of data, but there are also one or more known operations that either have been performed or that will be performed in order to reconcile the one or more inconsistencies in the distributed system.

In an exemplary implementation, one or more defined conditions are associated with a particular type of data located within a distributed system. These conditions provide a framework for determining whether the data located in the distributed system is consistent. In an exemplary embodiment, these conditions are defined by a system analyst for a particular type of data prior to implementing the distributed system. Alternatively, the conditions can be a default set of conditions associated with the particular type of data.

If a defined condition is not satisfied, i.e. the data violates the defined condition, the data is deemed inconsistent. In a case that there are one or more inconsistencies related to a particular type of data, the distributed system is in an unstable state. In order to return the distributed system from an unstable state to a stable state, the system analyst defines one or more operations that automatically reconcile the one or more inconsistencies resulting from the defined conditions that have been violated. These one or more operations are described further below with respect to FIGS. 3 and 4.

Thus in this exemplary embodiment, a distributed system is self-stabilizing because one or more defined operations allow the distributed system to automatically reconcile one or more inconsistencies related to one or more types of data located within the distributed system.

As discussed with respect to FIGS. 1 and 2, consistency within a distributed system is customized in order to encompass a wide variety of higher level policies suited for a particular type of distributed system that a business application implements using a variety of types of data. Consistency results when one or more conditions are defined by a system analyst for one or more types of data managed across a particular set of nodes within a distributed system. Thus, the defined conditions are customized conditions set for a particular type of data.

This customization goes a step further when the system analyst defines one or more operations reconciling the one or more inconsistencies. Thus the distributed system is implemented in a customized manner to be self-stabilizing.

In the example of FIG. 1, the distributed system is stable when the copy of the document X 114 at server 102 is the same as the original document X 116 on the client 106. Thus, the customization refers to specifying a condition that the server 102 stores a backup copy of the original document created and modified on the client 106.

FIG. 2 on the other hand, addresses a slightly more complex customized condition. This defined condition is more complex because instead of merely copying data, bit by bit, from one location to another, the distributed system is configured to identify two identical types of data (employee names) within a database which includes hundreds of names.

The descriptions given with respect to FIGS. 1 and 2 are merely examples of defined conditions that can be pre-set and customized in accordance with a particular type of data. Of course, there is a variety of different types of data utilized within any given distributed system. Thus a variety of customized conditions will be pre-set in accordance with each type of data so that the distributed system functions properly and errors can be reduced by identifying inconsistencies that result when the customized conditions are violated. These customized conditions help flag higher-level policies associated with more complex distributed systems.

As previously mentioned, a system analyst defines customized conditions for each particular type of data located within a distributed system for a variety of reasons. For example, there may be an ideal range of values that the system analyst would like to use as a predicate for the particular type of data. Another example would be to eliminate confusion when processing a certain type of data, such as making sure the price of a product sold on-line is continually updated from one node to another in the distributed system so that on-line consumers are receiving correct pricing information.

The system analyst also defines one or more customized operations that return the distributed system from an unstable state to a stable state by reconciling the one or more inconsistencies. Although, the exemplary systems corresponding to a document management and database merger have been described with respect to FIGS. 1 and 2, these types of systems are discussed for illustration purposes only, and are not intended to limit the scope of the claimed subject matter.

The one or more operations are defined to reconcile higher level policies than those discussed in the document management system. In many situations, inconsistencies can not be resolved by simply copying data, as is done with the synchronization process previously described. This synchronization process does not allow a system analyst to specify, i.e. customize, a set of conditions for each particular type of data within the distributed system.

By allowing a system analyst to define customized conditions for one or more types of data within a distributed system, and further define one or more customized operations that reconcile any inconsistency resulting from a condition that has not been satisfied, the system is able to account for higher level policies that simple synchronization in a distributed system will not resolve. These higher level policies permit the system analyst to understand the complex situations causing inconsistencies.

In order to illustrate a self-stabilizing distributed system, an exemplary implementation relating to a document management system is explained below along with the features and procedures of the embodiment in the discussion of FIGS. 3-7. This exemplary implementation is by no means intended to limit the scope of the embodiment to document management systems in general. Instead, it is explained in order to provide an exemplary application of how stability is maintained within a distributed system.

Exemplary Environment

Figure 3:
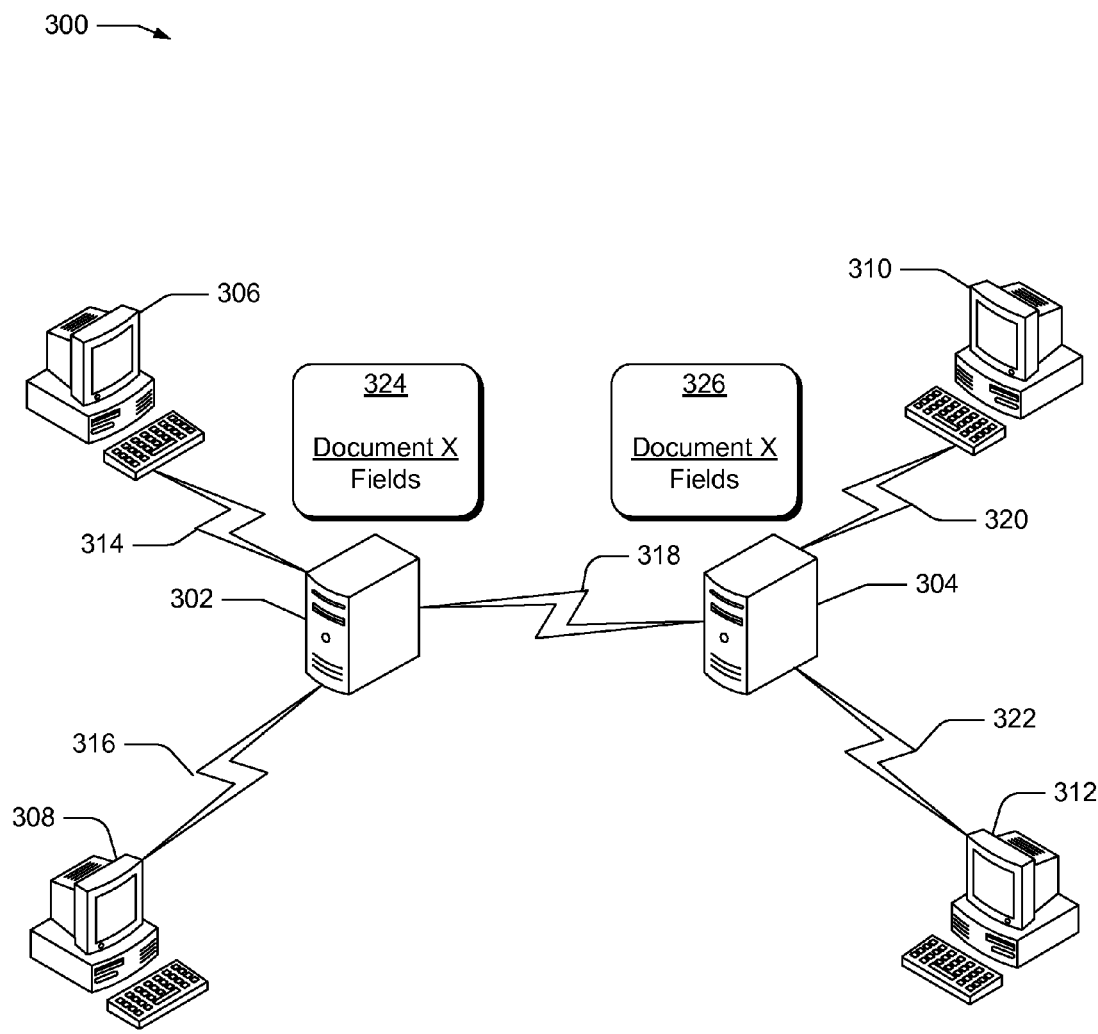
FIG. 3 is an illustration of an environment in an exemplary distributed system operable to employ the techniques of the one or more embodiments described herein.

FIG. 3 is an exemplary environment of a distributed system 300 with two connected servers (302 and 304) and four clients (306, 308, 310 and 312). The clients (306, 308, 310 and 312) may be configured as a computing device, such as a desktop computer, a mobile station, a wireless phone and so forth. The servers (302 and 304) and clients (306, 308, 310 and 312) are each connected via a network connection (314, 316, 318, 320 and 322).

Each network connection (314, 316, 318, 320 and 322) may assume a wide variety of configurations. For example, each network connection may include an internet connection, a wide area network (WAN) connection, a local area network (LAN) connection, a wireless network connection, a public telephone network connection, a peer to peer network connection, or any combination thereof. A wide variety of other instances are also contemplated without departing from the spirit and scope thereof.

In FIG. 3, the distributed system stores one or more types of data on one or more nodes within the distributed system. Furthermore, the distributed system maintains stability across the one or more nodes. As previously mentioned, the distributed system is in a stable state when one or more types of data stored on one or more nodes in the distributed system are consistent in accordance with defined conditions, one or more particular nodes in the distributed system are not obligated to stabilize, or in an event there are known inconsistencies, there are also one or more operations that either have been performed or that will be performed in order to reconcile the one or more inconsistencies. If the system is unstable, then stability is reestablished by applying one or more operations capable of reconciling the identified inconsistencies.

For example, in FIG. 3 each server (302 and 304) and each client (306, 308, 310 and 312) are nodes within the distributed system. In the exemplary implementation of a document management system, a first defined customized condition set by a system analyst, is that a document and its associated fields 324 stored on server 302 are the same as the corresponding document and its associated fields 326 stored on server 304, i.e. that the two servers contain corresponding snapshots of all documents and their associated fields. Additionally, a second defined customized condition may be that the creator of a document must be notified of any edit performed on the document by another via an email notification.

Referring to FIG. 3, assume that network connection 318 is down and server 302 is not connected to server 304 via network connection 318. While the network connection 318 is down, client 306 accesses server 302 and edits a document X stored thereon. While editing the document, client 306 adds a new additional associated field specifying the last person to edit the document, the additional associated field identifying client 306.

Now assume that the original creator of document X is client 310 and along with the creation of document X, client 310 creates a single associated field specifying the creator of the document, the single associated field identifying client 310. Document X and the single associated field are stored at server 304.

Next, when the servers 302 and 304 are reconnected, it is determined that the copy of the document X and its associated fields 324 stored on server 302 are not the same as the copy of the document X and its associated fields 326 stored on server 304, because the copy on server 302 contains the edited document X along with the new additional associated field identifying client 306, the last person to edit the document, while the copy on server 304 contains the original document X and the single associated field identifying the creator, client 310.

Upon this reconnection, the distributed system determines that both defined customized conditions previously set within the distributed system have been violated. Specifically, the copy of document X and any associated fields are no longer the same on both servers 302 and 304 and the creator of document X, client 310, has not been notified via an email of the edit performed to document X by client 306. Thus in this scenario, the distributed system as described would be in an unstable state.

Figure 4:
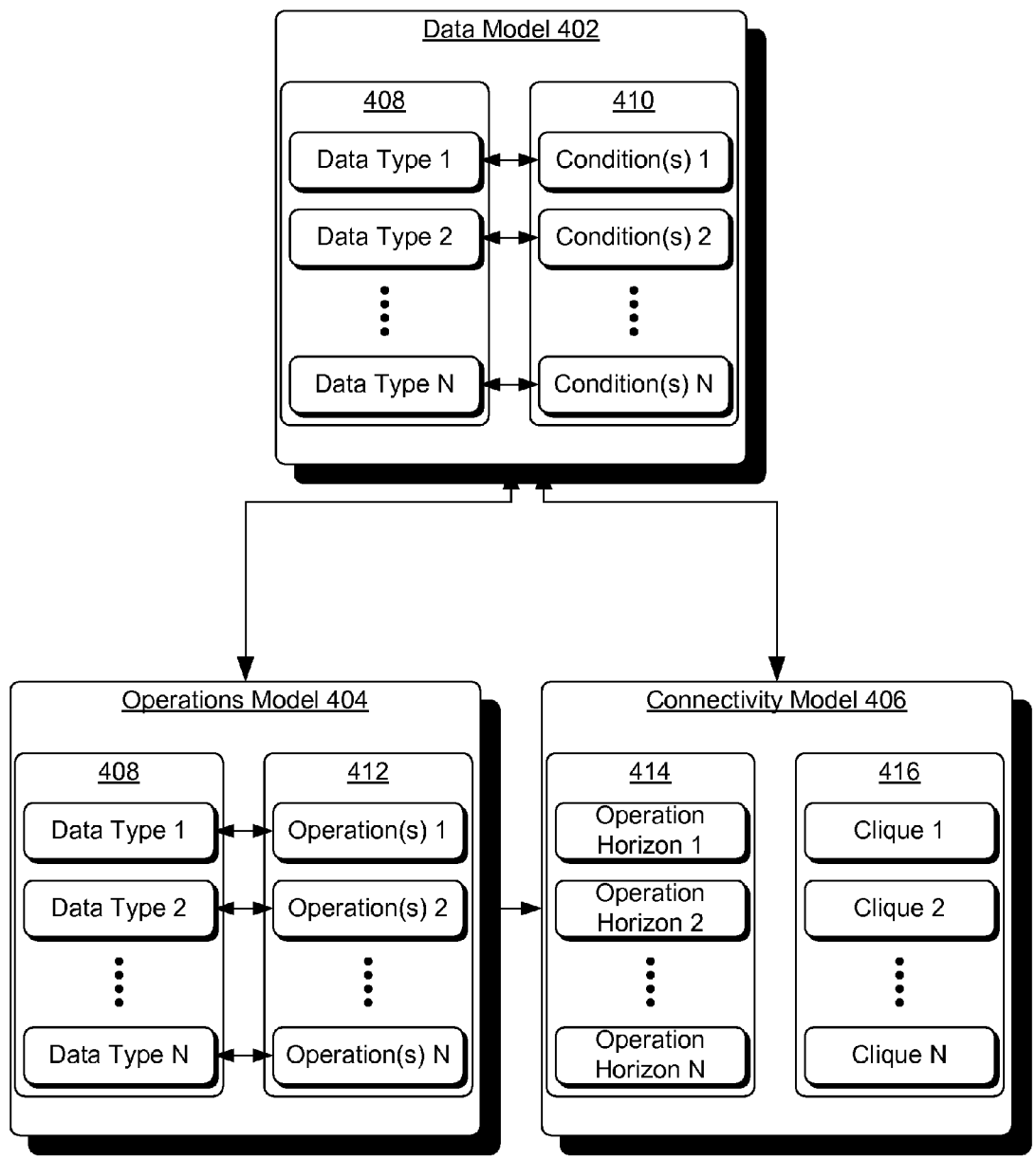
FIG. 4 illustrates three interrelated models that facilitate the analysis of a distributed system.

FIG. 4 illustrates three types of interrelated models 400 that analyze exemplary distributed systems and allow a distributed system, i.e. the document management system scenario discussed above with respect to FIG. 3, to self-stabilize. The three types of interrelated models 400 allow a system analyst to analyze a distributed system before actually implementing the distributed system. Based on the analysis, the system analyst can define, i.e. customize, one or more conditions for one or more types of data located within the distributed system. Then the system analyst accounts for all possible inconsistencies by defining one or more operations reconciling the one or more inconsistencies. As a result, the distributed system can guarantee that all inconsistencies that lead to consequential errors will be reconciled and thus, the system is self-stabilizing.

The three interrelated models 400 include:
A data model 402 specifying one or more types of data located within the distributed system and one or more defined conditions for each type of data located in the distributed system;
An operations model 404 defining one or more customized operations that are performed on the one or more types of data located within the distributed system when one or more inconsistencies result when defined conditions have been violated; and
A connectivity model 406 defining how the one or more types of data and the one or more operations interact across one or more nodes in the distributed system in order to bring the distributed system from an unstable state back to a stable state.

Data Model

The data model 402 defines one or more types of data 408 located across one or more nodes in a distributed system. As previously mentioned, exemplary distributed systems may include data associated with data-centric business applications, including on-line stores, document management systems and patient portals. Thus, associated with these types of distributed systems are a variety of different types of data located across one or more nodes. Such types of data may include for example, credit card information, copies of documents, login information, etc.

The data model 402 also allows a system analyst to define one or more customized conditions 410 associated with each of the one or more types of data 408 located within the distributed system. The customized conditions 410 are defined for each particular type of data 408. These customized conditions 410 allow the distributed system to determine whether the data located across one or more nodes is consistent. When the particular type of data 408 satisfies the customized conditions 410, the data is consistent. When the particular type of data 408 does not satisfy, i.e. violates, the conditions 410, the data is inconsistent.

As previously indicated in the exemplary implementation of a document management system described above with respect to FIG. 3, the defined conditions specify that first, a copy of a document and any associated field be the same on the two separate servers (302 and 304), and second, the original creator (client 310) of document X be notified of any edit made to the original document. However, these examples are only two of any numerous customized conditions a system analyst may define in association with a document management system.

Thus, the defined conditions 410 ultimately allow the distributed system to determine if each particular type of data 408 is consistent. The conditions are pre-set by a system analyst for each of the one or more types of data 408 located in one or more nodes in the distributed system.

Operations Model

The operations model 404 characterizes one or more data operations 412 that reconcile an inconsistency that results when one or more of the customized conditions 410 for a particular type of data 408 are violated, as defined in the data model 402. A system analyst defines one or more data operations 412 for each inconsistency that results when one or more of the customized conditions 410 in the data model are violated. In order to reconcile a single inconsistency, the operations model can define a single operation or a series of two or more operations performed in sequence.

Thus, the operations model 404 is utilized by system analysts to define reconciliation and account for all possible inconsistencies that result when the data in the distributed system violates the customized conditions 410. By either automatically performing the one or more operations 412 defined in the operation model 404, or knowing that there is one or more operations 412 that will be automatically performed accounting for the inconsistency, the distributed system is capable of returning from an unstable to a stable state.

In the exemplary implementation of document management system described above with respect to FIG. 3, a system analyst may define that in the case a new additional associated field is added to an original document X while editing the original document X, then a defined operation updates the original document X with the new field reconciling the first condition. On the other hand, a user may define that the new field is simply deleted from the edited copy of the document X so that the two documents on servers 302 and 304 are the same. Both of these examples are operations that bring the copy document X located on server 302 and 304, from an inconsistent state back to a consistent state.

In order to address the second condition, i.e. that the creator of the document is notified via an email of any edit to the document, a system analyst defines that a simple email is generated within the system and sent to the original creator of document X, client 310, notifying client 310 of the edit made by client 306. This operation reconciles the inconsistency that resulted when client 306 edited document X. If an operation is defined for both inconsistencies that result from client 306 editing document X, then the distributed system is returned from an unstable to a stable state. In this scenario the distributed system is self-stabilizing.

Connectivity Model

The connectivity model 406 provides a classification of the nodes that may exist in the distributed system. For example, in the document manage system nodes are classified as client-type or server-type. The connectivity model 406 also enumerates the one or more types of data 408 that can be contained by a node of a particular classification.

Additionally, the connectivity model 406 specifies if nodes of classification S (e.g. server-type) and classification T (client-type) can communicate. For example, nodes N and M in the distributed system can communicate only if node N, classified as a T node, and node M, classified as an S node are allowed to communicate by the connectivity model 406. Using this information, the connectivity model 406 determines how the information in the data model 402 and operations model 404 interact, and ultimately determine whether the distributed system has adequate operations to reconcile the one or more possible inconsistencies.

In order to do this, the connectivity model 406 identifies each operation 412 defined by the operations model 404 for a particular type of data 408 and first defines an operation horizon 414. An operation horizon 414 defines how many nodes in the network need to be connected for the operation to succeed. In other words, the connectivity model 406 determines how much connectivity is necessary to perform a reconciling operation 412 on the particular type of data 408 in order to reconcile the one or more inconsistencies.

Thus, upon implementation of reconciling an inconsistency, or when the distributed system is attempting to self-stabilize, the nodes identified in the operation horizon 414 must be connected in order to bring the distributed system from an unstable to a stable state.

In the exemplary implementation of document management system described above with respect to FIG. 3, the operation horizon for updating document X on server 304 is simply server 302 and server 304. For the second condition relating to an email notification, an exemplary operation horizon is server 304 that generates an email to be sent to the mailbox of client 310, notifying client 310 of the edit to document X.

In addition to defining an operation horizon 414 for each type of data, the connectivity model also analyzes and defines one or more cliques 416 for each type of data 408 located in the distributed system. A clique 216 is two or more nodes that are completely connected. A clique 416 is defined as the smallest set of nodes where a particular type of data 408 should be stable. This set of nodes may also be referred to as a subnet.

A clique is a set of nodes that are pairwise connected. A clique is also called a completely connected subnet, because every node in the clique is connected to every other node. The connectivity model determines how nodes may connect, and therefore determines the cliques that may be observed in the distributed system. These cliques are not enumerated in the connectivity model, but are a direct consequence of the information contained in the connectivity model.

As previously mentioned, it is difficult to maintain stability across every node in a distributed system. However, if the distributed system is split into one or more cliques 416, or subnets, then the distributed system is separated into simple parts where stability can be understood. Using the defined cliques 416, stability across a set of nodes can be understood by the system analyst.

This concept allows for example, multiple sets of client/server combinations to maintain stability with each other. For example, in FIG. 3, server 302, client 306 and client 308 may be a clique. Additionally server 304, client 310 and client 312 may be another clique. The separate cliques first seek to provide local stabilization within their individual cliques. When server 302 and server 304 are disconnected, i.e. when network connection 318 fails, for example, assuming there is no inconsistent data within the two separate cliques, each clique does not know of any instability with respect to the other. Each separate clique does not seek to maintain stability with the other. Instead the clique seeks to maintain stability within its own set of nodes.

If the nodes within two distinct cliques become completely connected to one another, for example via a network connection, they will seek to maintain stability across the larger set of nodes including a union of a first clique and a second clique. Thus, a set of nodes maintaining stability is always dynamically changing because of connections/disconnections of defined cliques.

As a result of defining one or more operation horizons 414, and one or more cliques 416, the connectivity model 406 can provide a framework that a distributed system uses to maintain stability. This allows the analysis to determine an operation horizon 414, i.e. a set of nodes necessary for an operation 412 to succeed, and identify a clique 416 where stability is defined for a particular set of nodes. Thus, the connectivity model 406 provides a blueprint for how the distributed system can self-stabilize.

The data model 402, the operations model 404 and the connectivity model 406 work together to provide an analysis of every possible scenario that can go wrong within a distributed system. It is noted, that different types of data located within the distributed system will lead to different types of defined inconsistencies and therefore different operations defined by the system analysts that provide reconciliation of the inconsistencies.

Figure 5:
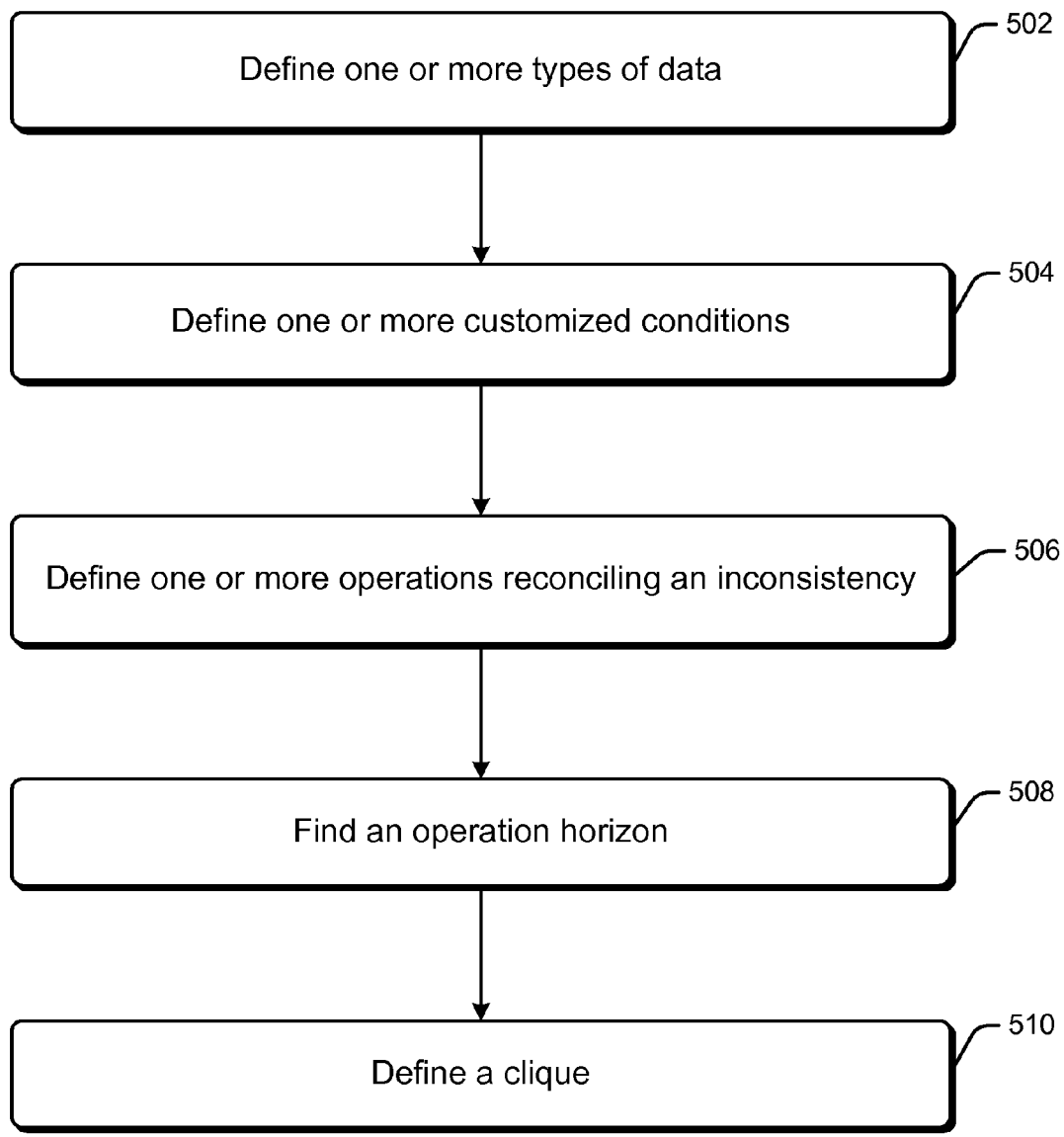
FIG. 5 is a flow diagram depicting an exemplary process in which a distributed system is modeled and analyzed.

FIG. 5 is a flowchart describing an exemplary process 500 of the analysis performed by the interrelated data model 402, the operations model 404, and the connectivity model 406 as explained above with respect to FIG. 4, prior to implementing a distributed system. Aspects of the exemplary process may be implemented in hardware, firmware, or software, or a combination thereof. The exemplary process is shown as a set of blocks that specify operations performed by one or more devices and are not necessarily limited to the orders shown for performing the operations by the respective blocks.

At 502, the data model defines one or more types of data located on one or more nodes within the distributed system. The one or more types of data represent information used to implement the distributed system. In other words, the one or more types of data defined will be associated with the type of distributed system implemented. As previously specified, exemplary systems may include data-centric business applications. Thus the one or more types of data would be the information used in a particular business application.

At 504, the data model defines one or more customized conditions associated with the one or more types of data defined at 502. In one embodiment, the customized conditions are defined by a system analyst prior to implementing the distributed system. The conditions provide parameters specifying whether the particular type of data is in a consistent or inconsistent state by comparing the data with the customized conditions. If the data contradicts the condition, then the data is inconsistent, while if the data satisfies the condition, then the data is consistent.

At 506, the operations model defines one or more operations for the one or more types of data that will reconcile any inconsistency that results from a violated condition. The one or more data operations are associated with the type of distributed system implemented, such as the exemplary document management system previously discussed.

At 508, the connectivity model finds an operation horizon for the one or more operations defined at 506. The operation horizon determines the nodes in the distributed system necessary to successfully perform the operation.

At 510, the connectivity model defines a clique for the one or more types of data. The clique defines a subnet of the distributed system where stability is maintained. A clique is a set of nodes completely connected to one another.

Figure 6:
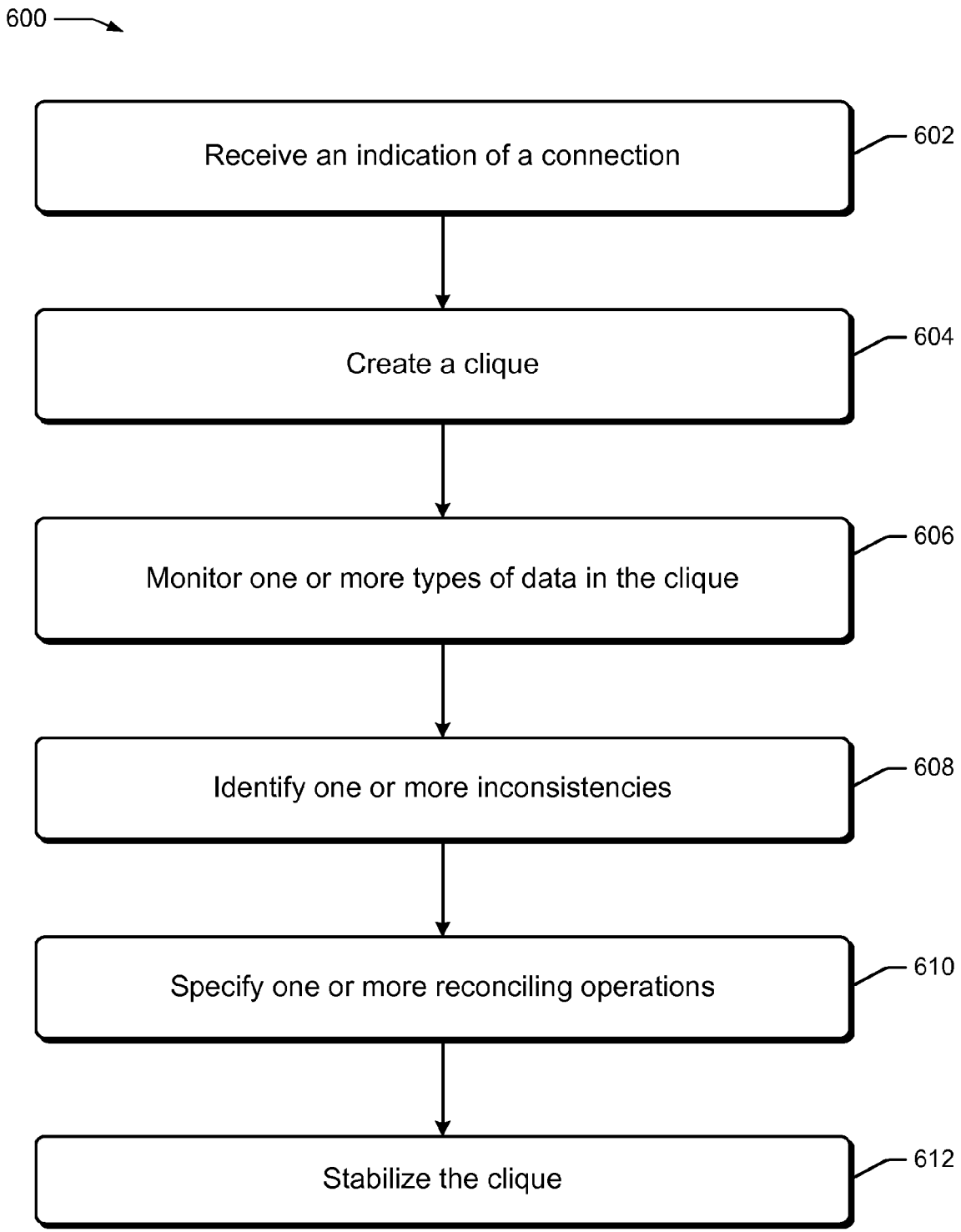
FIG. 6 is a flow diagram depicting an exemplary process in which a distributed system uses the analysis depicted in FIG. 5 to self-stabilize.

FIG. 6 is a flowchart describing a process 600 that uses the results of the analysis process in FIG. 5. In FIG. 6, the distributed system self-stabilizes in response to a received indication of a reconnection by checking to see if one or more types of data in a clique are consistent, resulting in a stable clique.

At 602, the distributed system receives an indication of a connection. This connection is established between a first node and a second node. In one embodiment, the connection is a reconnection resulting from a failed network connection between the first and second nodes. In another embodiment, the connection is established subsequent to an intentional disconnection between the first and second nodes within the distributed system. In any event, the distributed system determines two nodes, not previously connected, have been connected. In one implementation, the two nodes are part of two separate cliques defined in the connectivity model.

At 604, the distributed system creates a clique from connecting the first and second nodes at 602. In one embodiment, the clique includes all the nodes in a first clique including the first node and all the nodes in a second clique including the second node.

At 606, the distributed system monitors, i.e. tests, whether one or more particular types of data located across the connected nodes in the distributed system are consistent in accordance with one or more pre-set and customized conditions defined by a system analyst for each particular type of data, as specified in the data model.

At 608, the distributed system identifies one or more inconsistencies associated with the one or more types of data monitored at 606. An inconsistency results when one or more customized conditions pre-set by a system analyst for each type of data are violated.

At 610, the distributed system specifies one or more reconciling operations implemented to reconcile the one or more inconsistencies identified at 608. The one or more reconciling operations are customized by the system analyst for each particular type of data. When the one or more operations are performed reconciling each inconsistency for a particular type of data, the type of data is returned from an inconsistent to a consistent state.

At 612, the distributed system stabilizes the clique by performing the one or more reconciling operations reconciling the one or more inconsistencies that result when one or more customized conditions pre-set for one or more types of data are violated.

Figure 7:
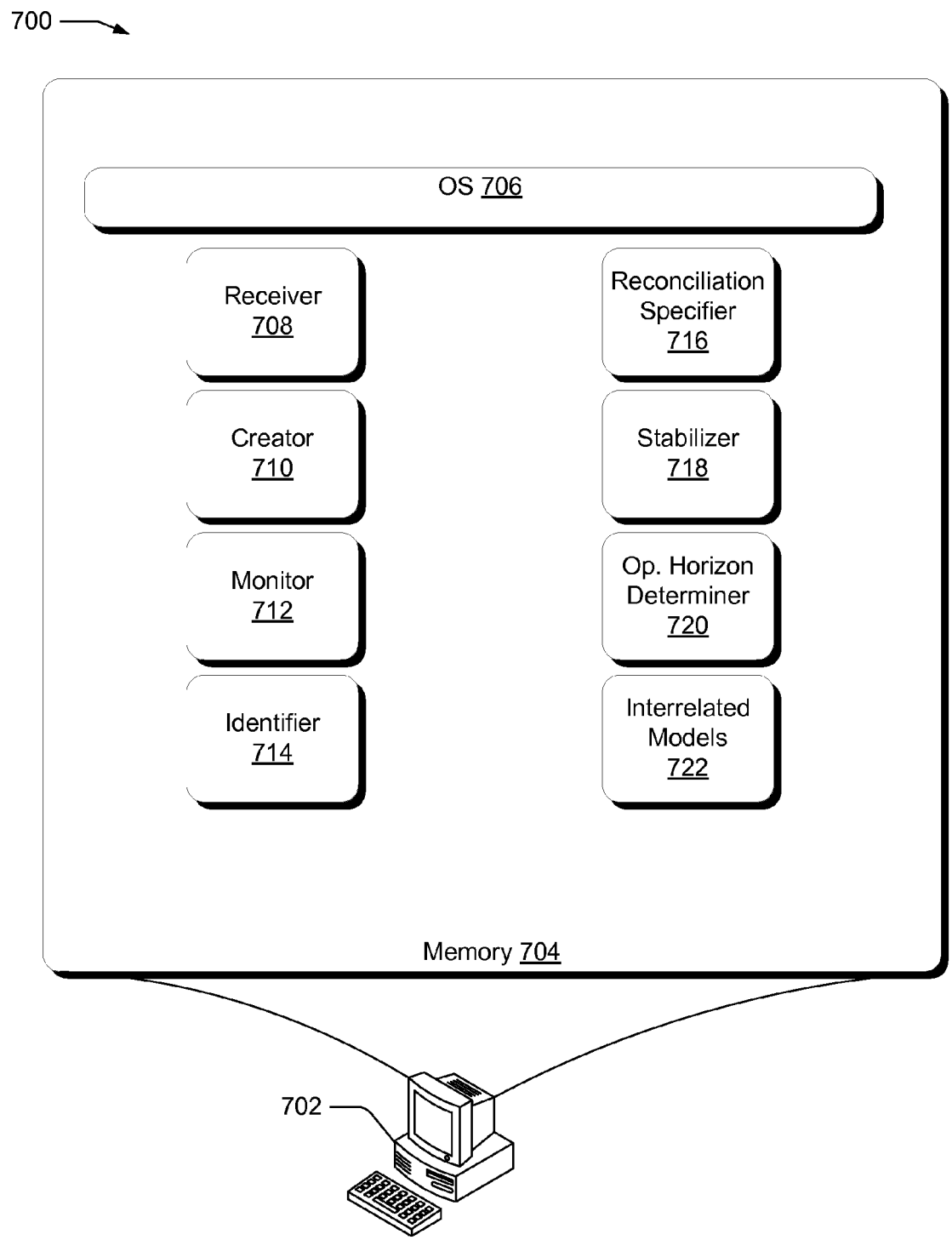
FIG. 7 is an illustration of an exemplary operating environment utilized to stabilize a distributed system.

FIG. 7 is an exemplary operational environment configured to implement the stabilizing process described in FIG. 6.

As depicted in FIG. 7, the exemplary operational environment is implemented on a network computer 702. The network computer 702 typically includes a variety of processor-readable media, including a memory 704. Such media may include any available media that are accessible by the network computer 702 and include both volatile and non-volatile media, removable and non-removable media.

An operating system 706 is shown stored in the memory 704 and is executed on the network computer 702. Also stored on the memory are software modules that implement the process illustrated in FIG. 6. These software modules include a receiver 708, a creator 710, a monitor 712, an identifier 714, a reconciliation specifier 716, a stabilizer 718 and an operation horizon determiner 720.

The receiver 708 receives an indication of a connection between a first node and a second node. The creator 710 creates a clique. The monitor 712 monitors the clique for consistency across one or more types of data located in the first and second nodes. The identifier 714 identifies one or more inconsistencies found across the one or more types of data located in the first and second node. The reconciliation specifier 716 specifies one or more reconciling operations reconciling the one or more inconsistencies. The stabilizer 718 stabilizes the clique by initiating performance of the one or more operations specified by the reconciliation specifier 716. Finally, the operation horizon determiner 720 defines a particular set of nodes that must be connected to perform the one or more operations.

Also stored on the memory of the network computer the are three interrelated models, i.e. the data model, the operations model and the connectivity model, as explained above with respect to FIG. 4.

CONCLUSION

Although the one or more embodiments have been described in language specific to structural features and/or methodological acts, it is to be understood that the one or more embodiments defined in the appended claims is not necessarily limited to the specific features or acts described. Rather, the specific features and acts are described as exemplary forms of implementing the claimed embodiments.

The invention claimed is:

1. A method for facilitating stabilization of a distributed system, the method comprising:
   receiving an indication of a connection between a first node and a second node, each of the first node and second node storing one or more types of data;
   creating a clique, the clique comprising the first node, the second node, and a plurality of other connected nodes;
   monitoring the clique for consistency across the one or more types of data located in the plurality of nodes in the clique, wherein the one or more types of data are consistent when one or more conditions defined for each type of data are satisfied, the one or more conditions being pre-set and customized in accordance with each particular type of data;

identifying one or more inconsistencies occurring in the clique by checking the one or more conditions for data consistency over the clique;

specifying one or more reconciling operations, wherein the one or more reconciling operations reconcile the one or more identified inconsistencies;

determining an operation horizon, wherein the operation horizon defines a particular set of nodes performing the one or more operations reconciling the one or more identified inconsistencies; and stabilizing the clique by initiating performance of the one or more reconciling operations, wherein the stabilizing produces a stable clique, a stable clique being a plurality of nodes, wherein each node is connected to one another and wherein the one or more types of data contained over the clique satisfies the one or more conditions.

2. A method as recited by claim 1, wherein the particular set of nodes must be connected to successfully perform the one or more reconciling operations.

3. A method as recited by claim 1, wherein the one or more conditions are defined by a system analyst.

4. A method as recited by claim 1, wherein the stabilizing comprises performing a plurality of reconciling operations in sequence over a set of cliques.

5. In a distributed system comprised of a plurality of nodes, one or more computer-readable media having stored thereon, computer-executable instructions that, when executed by a computer, direct performance of a method for facilitating stabilization of the distributed system, the method comprising:

receiving an indication of a connection between a first node and a second node, each of the first node and second node storing one or more types of data;

creating a clique, the clique comprising of a set of completely connected nodes including the first node and the second node;

monitoring the clique for consistency across the one or more types of data persisting over the clique, wherein the one or more types of data are consistent when one or more conditions defined for each type of data are satisfied, the one or more conditions being pre-set and customized in accordance with each particular type of data;

identifying one or more inconsistencies found across the one or more types of data located in the clique;

stabilizing the clique by reconciling the one or more inconsistencies found across the one or more types of data located in the clique, wherein the stabilizing comprises:

determining an operation horizon that defines a particular set of nodes for performing one or more operations reconciling the one or more identified inconsistencies; and performing the one or more operations that reconcile the one or more inconsistencies found across the one or more types of data located in the clique.

6. One or more computer-readable media as recited by claim 5, wherein the particular set of nodes must be connected to successfully perform the one or more operations.

7. One or more computer-readable media as recited by claim 5, wherein the one or more conditions are defined by a system analyst.

8. One or more computer-readable media as recited by claim 7, wherein the clique further comprises a plurality of nodes, each node being completely connected to one another.

9. One or more computer-readable media as recited by claim 7, wherein the stabilizing produces a stable clique, a stable clique being a plurality of nodes, wherein each node is connected to one another and wherein the one or more types of data located across the plurality of nodes are consistent.

10. One or more computer-readable media as recited by claim 5, wherein the stabilizing comprises performing a plurality of reconciling operations in sequence over a set of cliques.

11. A distributed system comprising:

a processor;

one or more computer-readable media having embodied thereon computer-executable instructions that, when executed by the processor, configure the distributed system to perform acts comprising:

receiving an indication of a connection between a first node and a second node, each of the first node and second node storing one or more types of data;

creating a clique, the clique comprising the first node and the second node, and a plurality of other nodes so that all nodes are fully connected;

monitoring the clique for consistency across the one or more types of data located in the clique, wherein the one or more types of data are consistent when one or more conditions defined for each type of data are satisfied, the one or more conditions being pre-set and customized in accordance with each particular type of data;

identifying one or more inconsistencies found across the one or more types of data located in the clique;

determining an operation horizon, wherein the operation horizon defines a particular set of connected nodes for performing one or more operations reconciling the one or more inconsistencies; and stabilizing the clique by performing the one or more operations reconciling the one or more inconsistencies found across the one or more types of data located in the clique.

12. A distributed system as recited by claim 11, wherein the one or more conditions are defined by a system analyst.

13. A distributed system as recited by claim 11, wherein the stabilizing comprises performing a plurality of reconciling operations in sequence over a set of cliques.

* * * * *